(12) United States Patent
Wangsvick et al.

(10) Patent No.: US 10,734,716 B2
(45) Date of Patent: Aug. 4, 2020

(54) BROADBAND UNMANNED AERIAL VEHICLE (UAV) PATCH ANTENNA

(71) Applicant: Raytheon Company, Waltham, MA (US)

(72) Inventors: Chad Wangsvick, Tucson, AZ (US); Drew Campbell, Marana, AZ (US)

(73) Assignee: Raytheon Company, Waltham, MA (US)

( * ) Notice: Subject to any disclaimer, the term of this patent is extended or adjusted under 35 U.S.C. 154(b) by 22 days.

(21) Appl. No.: 16/178,772

(22) Filed: Nov. 2, 2018

(65) Prior Publication Data

US 2020/0144704 A1    May 7, 2020

(51) Int. Cl.
| | |
|---|---|
| *H01Q 5/25* | (2015.01) |
| *H01Q 1/28* | (2006.01) |
| *H01Q 1/48* | (2006.01) |
| *H01Q 1/52* | (2006.01) |
| *H01Q 1/38* | (2006.01) |
| *B64C 39/02* | (2006.01) |
| *B64C 1/00* | (2006.01) |

(Continued)

(52) U.S. Cl.
CPC .............. *H01Q 1/286* (2013.01); *B64C 1/00* (2013.01); *B64C 39/024* (2013.01); *B64D 7/00* (2013.01); *H01Q 1/38* (2013.01); *H01Q 1/48* (2013.01); *H01Q 1/52* (2013.01); *H01Q 9/0414* (2013.01); *B64C 2001/0072* (2013.01)

(58) Field of Classification Search
CPC ............ H01Q 1/286; H01Q 1/48; H01Q 1/38; H01Q 1/52; H01Q 9/0414; B64C 1/00; B64C 7/00

USPC ........................................................ 343/705
See application file for complete search history.

(56) References Cited

U.S. PATENT DOCUMENTS

| | | | |
|---|---|---|---|
| 6,056,237 A | 5/2000 | Woodland | |
| 8,982,011 B1 * | 3/2015 | Gregoire | .............. H01Q 15/006 343/705 |

(Continued)

FOREIGN PATENT DOCUMENTS

WO    WO 2018/119341 A1    6/2018

OTHER PUBLICATIONS

Han et al., "Study on Miniaturization and Broadband of Patch Antenna Using Magneto-Dielectric Substrate;" IEEE Asian-Pacific Microwave Conference; Dec. 16-20, 2008; 4 Pages.

(Continued)

*Primary Examiner* — Huedung X Mancuso
(74) *Attorney, Agent, or Firm* — Daly, Crowley, Mofford & Durkee LLP

(57) ABSTRACT

Embodiments of the present disclosure relate to a UAV comprising a fuselage, a rotor, and a patch antenna element. The patch antenna element, which is provided from a patch antenna stack-up, is conformally disposed on an outer surface of the UAV's fuselage. The patch antenna comprises a first substrate, patch conductor, intermediate substrate, bottom substrate, and ground plane. The patch conductor is disposed on a top surface of the first substrate. A first surface of the intermediate substrate, which is a magneto-dielectric material, is disposed on a bottom surface of the first substrate. A top surface of the bottom substrate is disposed on a second surface of the intermediate substrate. A ground plane conductor is disposed on a bottom surface of the bottom substrate.

9 Claims, 3 Drawing Sheets

(51) Int. Cl.
  *B64D 7/00*   (2006.01)
  *H01Q 9/04*   (2006.01)

(56) References Cited

U.S. PATENT DOCUMENTS

| | | | |
|---|---|---|---|
| 9,309,006 B2* | 4/2016 | Zwaan | B64C 39/024 |
| 9,596,755 B2 | 3/2017 | Sethumadhavan et al. | |
| 9,902,487 B2* | 2/2018 | Alley | B64C 11/28 |
| 2011/0095951 A1* | 4/2011 | McCarthy | H01Q 1/28 |
| | | | 343/705 |
| 2016/0113113 A1 | 4/2016 | Sethumadhavan et al. | |
| 2017/0133762 A1 | 5/2017 | Ng et al. | |
| 2018/0182525 A1* | 6/2018 | Sprentall | H01Q 9/0407 |

OTHER PUBLICATIONS

Kyi et al., "Miniaturization of a Patch Antenna Using Magneto-Dielectric Material;" Proceedings of International Symposium on Antennas and Propagation (APSURSI); Oct./Nov. 2012; pp. 1433-1436; 4 Pages.

Luna Bonilla et al., "Miniaturization of a Microstrip Antenna with Magneto-Dielectrics Substrates for a Passive Tag RFID Operating at 915 MHz on a Metallic Surface;" 2014 IEEE Brasil RFID; Sep. 24, 2014; 3 Pages.

Morales, "Magneto-Dielectric Polymer Nanocomposite Engineered Substrate for RF and Microwave Antennas;" Graduate Theses and Dissertations: Graduate School; University of South Florida Scholar Commons; Oct. 21, 2011; 153 Pages.

Mosallaei et al., "Magneto-Dielectrics in Electromagnetics: Concept and Applications;" IEEE Transactions on Antennas and Propagation, vol. 52, No. 6; Jun. 2004; pp. 1558-1567; 10 Pages.

Ram Prasath et al., "Miniaturization of Patch Antennas Using Magneto-Dielectric Materials;" IEEE 2010 Indian Antenna Week—A Workshop on Advanced Antenna Technology; May/Jun. 2010; 4 Pages.

Tamma et al., "Metamaterial Inspired Electrically Small Patch Antenna;" IEEE 2011 International Symposium on Antennas and Propagation (APSURSI); Aug. 20, 2011; pp. 775-778; 4 Pages.

PCT Search Report dated Jul. 1, 2019 for PCT Application No. PCT/US2019/023982; 5 pages.

PCT Written Opinion dated Jul. 1, 2019 for PCT Application No. PCT/US2019/023982; 8 pages.

* cited by examiner

BROADBAND UNMANNED AERIAL VEHICLE (UAV) PATCH ANTENNA

RELATED APPLICATION(S)

Not applicable.

GOVERNMENT SUPPORT

Not applicable.

BACKGROUND

As is known in the art, unmanned aerial vehicles (UAVs) can communicate with a control station via a signal path often referred to as a datalink. The UAV can include a patch antenna to receive data over the datalink. A patch antenna is a type of antenna having at least one antenna element disposed over a ground plane. The at least one antenna element of the patch antenna may be coupled to a feed circuit (e.g. either directly coupled or capacitively or inductively) using various known balun structures or other known coupling devices.

As is also known, conventional patch antennas which are conformal to a UAV fuselage typically have very narrow bandwidth and/or have low gain characteristics. To solve this problem, one may increase the thickness of the patch antennas. By increasing the thickness of a patch antenna, the patch antenna is provided having bandwidth and/or gain characteristics which are increased relative to patch antennas which are not as thick. Increasing the thickness of a patch antenna however, increases the antenna's size and weight and, thus affects the amount of area and/or volume required on the UAV to house the antenna.

Furthermore, in cases where such a relatively thick patch antenna extends past an outer surface of a fuselage (i.e. so that the patch antenna is no longer conformal to an outer surface of the fuselage of the UAV) or the patch antenna is simply mounted on an outer surface of the UAV (again, such that the patch antenna is not conformal to the outer surface of the UAV fuselage), then a relatively thick patch antenna may also negatively impact the UAV's flight performance.

There is, therefore, a need for a UAV having a conformal patch antenna having relatively wide bandwidth and relatively high gain characteristics and that operates in an ultrahigh frequency (UHF) or very high frequency (VHF) band while maintaining a relatively small physical size.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one aspect of the concepts, devices and techniques described herein, an unmanned aerial vehicle (UAV) comprises a patch antenna element conformally disposed with respect to an outer surface of the UAV's fuselage. The patch antenna element is provided from a stack of dielectric materials (i.e. a patch antenna stack-up). The stack-up comprises a first substrate, a patch conductor disposed on a surface of the first substrate, a bottom substrate having a ground plane disposed on a surface thereof and an intermediate substrate provided from a magneto-dielectric material disposed between the first substrate and the bottom substrate.

In embodiments, the patch conductor is disposed on a top surface of the first substrate. A first surface of the intermediate magneto-dielectric substrate is disposed on a bottom surface of the first substrate. A top surface of the bottom substrate is disposed on a second surface of the intermediate magneto-dielectric substrate. A ground plane conductor is disposed on a bottom surface of the bottom substrate.

The patch antenna element can be conformally disposed on any portion (i.e. location/position) of the UAV fuselage. The location can be selected based on a location of, e.g., a control station and/or an intended UAV travel direction. In further embodiments, the location is selected to prevent self-interference with other antenna systems, e.g., instance Telemetry, on the UAV. Additionally, the location can be selected to reduce detection by enemy radar (e.g., reduce radar cross section). The patch antenna element can be configured to form a datalink with a control station. For example, the patch antenna element can be coupled to a datalink receiver disposed in the UAV to provide datalink communications in the ultrahigh frequency (UHF) range or very high frequency (VHF) range between the datalink receiver and the control station: The control station can be a ground-based vehicle or platform and/or an aerial vehicle or platform. The control station can include a controller that comprises circuitry to provide instructions to the UAV via the datalink. The instructions can be used to guide and/or control systems, e.g., cameras, sensors, etc., of the UAV.

In embodiments, the fuselage's outer surface can comprise a recess having dimensions to receive the patch antenna element such that that the patch antenna is conformally integrated with the outer surface.

In embodiments, the stack-up can have an overall thickness of about 0.250 inches. The first substrate can have a thickness of about 0.105 inches. The patch conductor can have a thickness of about 0.007 inches to about 0.0028 inches. The intermediate magneto-dielectric substrate can have a thickness of about 0.040 inches. The bottom substrate can have a thickness of about 0.105 inches. The ground plane can have a thickness of about 0.0014 inches.

The first and bottom substrates may be provided from a polytetrafluoroethylene (PTFE) material. The patch conductor and ground plane can be provided from any material responsive to radio-frequency (RF) signals. The intermediate magneto-dielectric substrate may be provided from a PTFE based magneto dielectric (e.g., Rogers MAGTREX) having a thickness of about 0.040 inches.

In embodiments, the patch antenna may be provided from one or an array of patch antenna elements.

A feed circuit can be coupled to the patch antenna. In embodiments, the feed circuit may include a coaxial signal path.

The stack-up can further comprise an interface which allows the patch antenna to be conformally disposed on an outer surface of the fuselage. In embodiments, the interface can be an adhesive. In other embodiments, the interface can be one of: a 2-sided tape, structural epoxy, mechanical fastening screws, etc. The adhesive can have a thickness of about 0.100.

In accordance with a still further aspect of the concepts, devices and techniques described herein, a UAV comprises a fuselage, at least one rotor coupled to the fuselage, a patch antenna conformally disposed on an outer surface of the fuselage. The conformal patch antenna may include a patch antenna stack-up comprising: a first substrate having first and second opposing surfaces, a patch conductor disposed on one of the first and second opposing surfaces of the first substrate, an intermediate substrate having first and second opposing surfaces, with one surface of said intermediate substrate disposed on one surface of the first substrate, the intermediate substrate provided from a magneto-dielectric material, a second substrate having first and second opposing surfaces, with one surface of the bottom substrate disposed on one surface of the intermediate substrate, such that the intermediate magneto-dielectric substrate is provided as an inner layer in the patch antenna stack-up and a ground plane conductor disposed on one surface of the bottom substrate.

Advantageously, embodiments of the patch antenna element have broad bandwidth while maintaining a small size. Additionally, embodiments of the antenna element have similar and/or better gain over a given bandwidth than conventional patch antennas.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
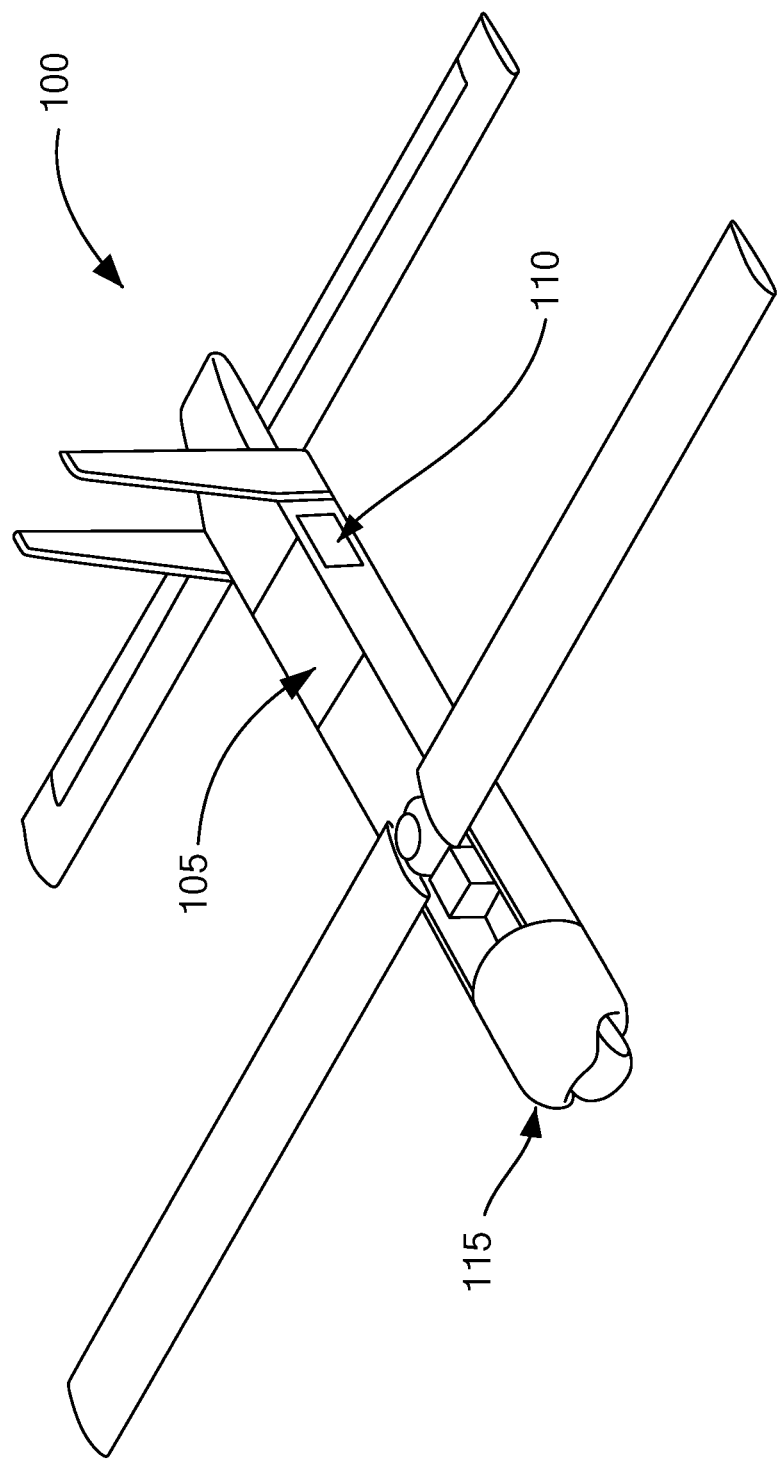
FIG. 1 is an isometric view of an unmanned aerial vehicle (UAV) having a conformal patch antenna with an intermediate magneto-dielectric substrate.

Referring now to FIG. 1, an unmanned aerial vehicle (UAV) 100 includes a fuselage 105 to which a rotor 115 is coupled and on which a patch antenna 110 is conformally disposed. Although the rotor 115 is illustrated as being coupled to a nose of the UAV, a skilled artisan understands that a rotor can be positioned anywhere on the UAV to provide lift and that more than one rotor may be coupled to the fuselage 105. Furthermore, the UAV may include one or more rotors.

Patch antenna 110 includes at least one dielectric layer corresponding to a magneto-dielectric substrate disposed between a first dielectric having one or more antenna elements disposed on a surface thereof and a bottom dielectric having an antenna ground plane disposed on a surface thereof. Thus, the magneto-dielectric substrate corresponds to an intermediate layer in a patch antenna stack-up. An illustrative patch antenna which may be the same as or similar to patch antenna 110 will be described in detail in conjunction with FIGS. 2 and 3 below. Suffice it here to say that by utilizing a magneto-dielectric substrate patch antenna 110 is provided having bandwidth and gain characteristics which are improved relative to a conventional patch antenna having the same size, shape, thickness and number of antenna elements.

The fuselage 105 can include a recess (not shown) that has dimensions configured to receive the patch antenna element 110 such that the patch antenna element 110 is conformally integrated with the fuselage's outer surface. The patch antenna element 110 can be positioned anywhere on the outer surface of the fuselage 105. In some examples, the patch antenna element 110 is positioned on the UAV at a location based on a location of, e.g., a control station and/or an intended UAV travel direction. In further embodiments, the location is selected to prevent self-interference with other antenna systems, e.g., instance Telemetry, on the UAV. Additionally, the location can be selected to reduce detection by enemy radar (e.g., reduce radar cross section).

The patch antenna element 110 can be configured to form a datalink with a control station (not shown). For example, the patch antenna element can be coupled to a datalink receiver (not shown) disposed in the UAV to provide datalink communications in the ultrahigh frequency (UHF) range or very high frequency (VHF) range between the datalink receiver and the control station. The control station can be a ground-based vehicle or platform and/or an aerial vehicle or platform. The control station can include a controller that comprises circuitry to provide instructions to the UAV via the datalink. The instructions can be used to control the UAV.

In embodiments utilized for datalink communications, the patch antenna element 110 can achieve a frequency bandwidth that is about 12-13 MHz. In other embodiments, the patch antenna element 110 can have a 2:1 Voltage Standing Wave Ratio (VSWR) bandwidth, e.g., extending over frequency range of about 467 MHz to about 479 MHz. Additionally, the patch antenna element 110 can have a gain greater than 0 dB. Due to the higher gain, the patch antenna element 110 can form datalink communications with the control station at an increased range. Further, the patch antenna element 110 achieve a low VSWR over a broad frequency band.

The patch antenna element 110 can achieve geometries (e.g. shapes such as and regular or irregular shapes including but not limited to rectangular, square, oval or circular shapes) that enable the patch antenna to be conformally disposed on any airframe regardless of the airframe's form factor. Additionally, the patch antenna element 110 have a thickness size which is less than the thickness of conventional patch antennas having the same antenna characteristics.

Figure 2:
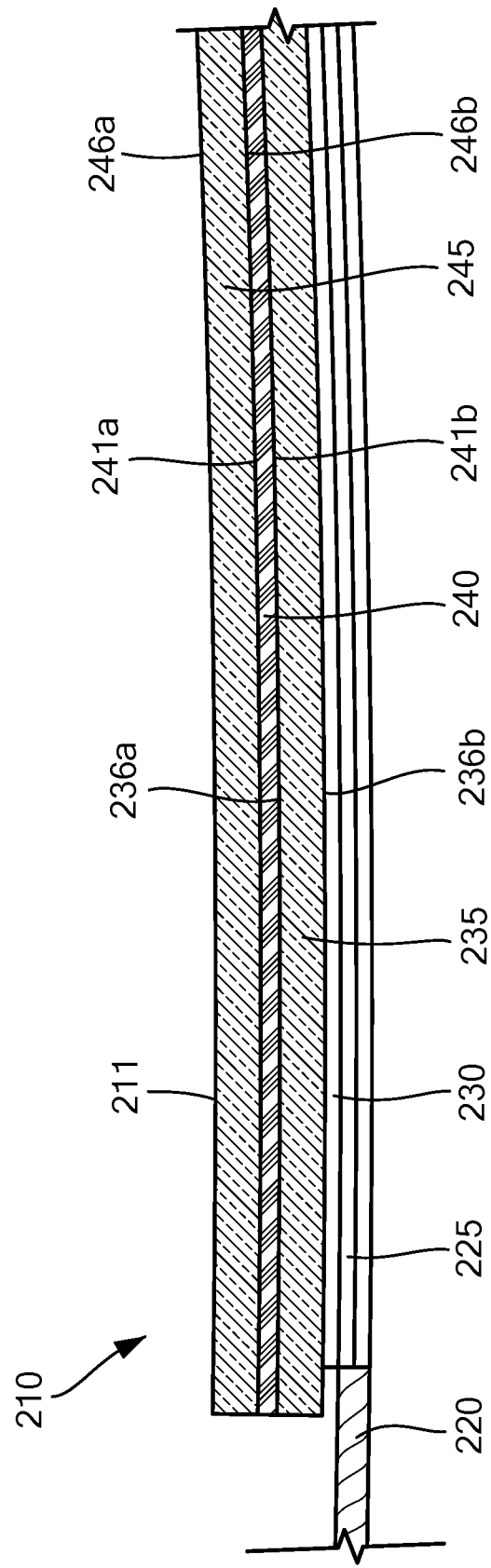
FIG. 2 illustrates a patch antenna having a patch stack-up which includes an intermediate magneto-dielectric substrate.

Referring now to FIG. 2 is an isometric view of a patch antenna 210 which may be the same as or similar to patch antenna 110 described above in conjunction with FIG. 1. Patch antenna 210 is provided from a patch antenna stack-up comprising a top substrate 245, a patch conductor or patch element 211 (e.g., the patch conductor 311 of FIG. 3), an intermediate magneto-dielectric substrate 240, a bottom substrate 235, and a ground plane 230. The patch conductor is disposed on a first surface 246a of the top substrate 245. The intermediate magneto-dielectric substrate 240 is disposed on a second surface 246b of the top substrate 245 via a first intermediate substrate surface 241a. The bottom substrate 235 has a first bottom substrate surface 236a which is disposed on a second intermediate substrate surface 241b of the intermediate magneto-dielectric substrate 240. The ground plane 230 is disposed on a second bottom substrate surface 236b of the bottom substrate 235.

An adhesive 225 can be attached to the ground plane 230 to enable the patch antenna element 210 to be conformally disposed on a fuselage of a UAV (e.g., the fuselage 105 of FIG. 1). Although, in FIG. 2, the adhesive 225 is illustrated as a double-sided tape, a skilled artisan understands that any adhesive or mechanical fastener (e.g., screws, etc.) can be used to conformally dispose the antenna element onto a surface of a UAV.

A feed circuit 220 can be coupled to the patch antenna element 210. Although, in FIG. 2, the feed circuit is illustrated as a coaxial transmission line (e.g. a coaxial cable), one of ordinary skill in the art will appreciate that any known or yet to be known feed circuit for use with patch antennas can be used to couple RF signals to/from the patch antenna 210.

In embodiments for operation in the frequency range of about 467 MHz to about 479 MHz and having a bandwidth characteristic of about 12 MHz and a gain characteristic of about 0 dBi, patch antenna 210 can be provided having an overall thickness of or about 0.25 inches. The top substrate 245 can have a thickness of or about 0.105 inches. The intermediate magneto-dielectric substrate 240 can have a thickness of or about 0.040 inches. The bottom substrate 235 can have a thickness of or about 0.105 inches. The ground plane 230 can have a thickness of or about 0.0014 inches.

A skilled artisan understands from the teachings herein that a thickness of the antenna element 210 can be adjusted to achieve enhanced bandwidth while maintaining high gain.

The top substrate 245 can comprise a polytetrafluoroethylene (PTFE) material. The intermediate substrate 240 can comprise a magneto-dielectric material. The bottom substrate 235 can comprise a polytetrafluoroethylene (PTFE) material. The ground plane 230 can comprise one or more of a copper, gold plated, or similar material.

The antenna element 210 can have low weight characteristics and, thus flight performance of the UAV is not substantively affected by the antenna element 210. The weight of the antenna element 210 can be a quarter of conventional patch antenna elements.

Figure 3:
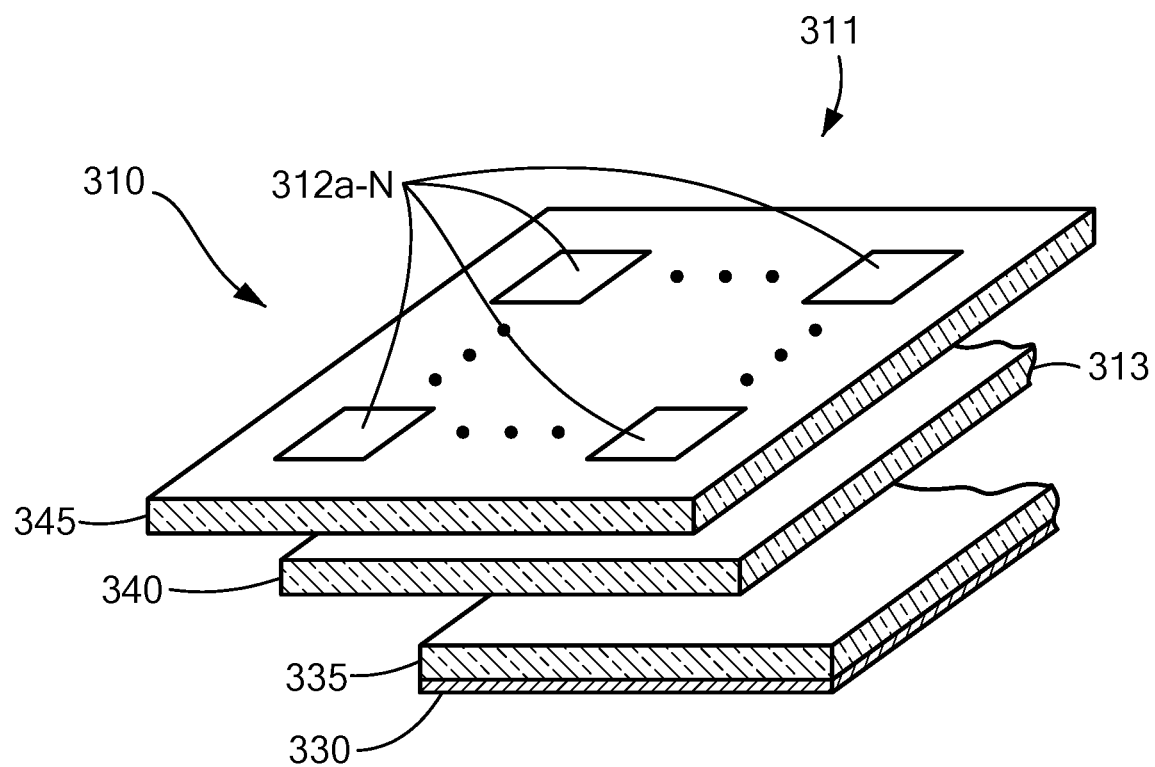
FIG. 3 is an exploded view of a patch antenna intermediate which includes a magneto-dielectric substrate

Referring now FIG. 3, a patch antenna 310 which may be the same as or similar to patch antennas 110, 210 of FIGS. 1 and 2, is configured to be disposed on a UAV (e.g. UAV 100) so as to be conformal to an outer surface of an unmanned aerial vehicle (UAV). The patch antenna is provided from a patch antenna stack-up 313. The stack-up 313 comprises a first substrate 345, a patch conductor 310, an intermediate magneto-dielectric substrate 340, a second substrate 335, and a ground plane 330.

The patch conductor 311 is disposed on a top surface of the first substrate 345. The patch conductor 311 can comprise an array of RF antenna elements 312a-N. In other examples, the patch conductor 311 can comprise a single RF antenna element. The patch conductor 311 can have a thickness between about 0.0007 inches to about 0.0028 inches. The patch conductor may be provided from any material which is conductive to RF signals in a desired RF operating range of the patch antenna (e.g. an electrical conductor such as, but not limited to, copper may be used).

Comprise, include, and/or plural forms of each are open ended and include the listed parts and can include additional parts that are not listed. And/or is open ended and includes one or more of the listed parts and combinations of the listed parts.

One skilled in the art will realize that the concepts described herein may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An unmanned aerial vehicle (UAV) comprising:
a fuselage having an inner surface and an outer surface;
at least one rotor coupled to said fuselage; and
a patch antenna element conformally disposed on the outer surface of said UAV fuselage in a recess of the outer surface having dimensions configured to receive the patch antenna element, said patch antenna element provided from a patch antenna stack-up comprising:
a first substrate having top and bottom opposing surfaces, the first substrate having a thickness of approximately 0.105 inches;
a patch conductor disposed on the top surface of said first substrate, the patch conductor comprising an array of a plurality of antenna elements;
an intermediate substrate having a first surface and a second opposing surfaces, with the first surface of said intermediate substrate disposed on the bottom surface of said first substrate, said intermediate substrate corresponding to a magneto-dielectric material, the intermediate substrate having a thickness of approximately 0.040 inches;
a bottom substrate having top and bottom opposing surfaces, with the top surface of said bottom substrate disposed on the second surface of said intermediate substrate, such that said intermediate magneto-dielectric substrate is provided as an inner layer in the patch antenna stack-up, the bottom substrate having a thickness of approximately 0.105 inches;
a ground plane conductor disposed on the bottom surface of said bottom substrate, the ground plane having a thickness of approximately 0.0014 inches; and
an adhesive surface coupled to the ground plane of the patch antenna element, thereby allowing the patch antenna element to be conformally disposed on and adhered to the outer surface of the fuselage,
wherein the patch antenna element is conformally disposed on the outer surface of the fuselage at a location based on one or more of: a location of a control station, an intended UAV travel direction, locations of other antenna systems on the UAV to prevent self-interference, location to reduce detection by enemy radar.

2. The UAV of claim 1 wherein the first and bottom substrates comprise a polytetrafluoroethylene (PTFE) material.

3. The UAV of claim 1 wherein the intermediate substrate comprises a magneto-dielectric material.

4. The UAV of claim 1 further comprising a feed circuit coupled to the patch antennal element.

5. The UAV of claim 1 wherein the feed circuit is a coaxial cable.

6. The UAV of claim 1 further comprising an interface configured to conformally dispose the patch antenna element on the outer surface.

7. The UAV of claim 1 wherein the patch antenna element is configured to form a datalink with a control station.

8. The UAV of claim 1 wherein the control station is a ground-based vehicle or platform and/or an aerial vehicle or platform.

9. The UAV of claim 1 wherein the patch antenna element is adhered to a rear side portion of the fuselage.

* * * * *